United States Patent [19]
Waechter et al.

[11] Patent Number: 6,128,992
[45] Date of Patent: Oct. 10, 2000

[54] SAW FOR REMOVING TOP AND BOTTOM PALLET DECK BOARDS

[75] Inventors: Ronald L. Waechter, Muncie; Thomas A. Waechter, Oldenberg, both of Ind.

[73] Assignee: Smart Products of Indiana, Inc., Muncie, Ind.

[21] Appl. No.: 09/271,425

[22] Filed: Mar. 17, 1999

[51] Int. Cl.[7] .............................. B26D 7/06; B23P 19/02
[52] U.S. Cl. ........................ 83/425.2; 83/810; 83/813; 83/441; 83/443; 83/444; 83/823; 83/943; 29/426.4
[58] Field of Search .................... 83/821, 943, 820, 83/823, 827, 808, 810, 813, 818, 441, 443, 444, 420, 425.2, 433, 734; 29/426.4, 564.3

[56] References Cited

U.S. PATENT DOCUMENTS

| | | | |
|---|---|---|---|
| 2,274,923 | 3/1942 | Hedgpeth | 83/818 X |
| 2,621,693 | 12/1952 | Grills | 83/813 X |
| 4,241,495 | 12/1980 | Wakeem | 83/943 X |
| 4,640,171 | 2/1987 | Jansson | 83/425.2 X |
| 5,201,110 | 4/1993 | Bane | 83/943 X |
| 5,323,525 | 6/1994 | Johnson | 83/943 X |
| 5,341,712 | 8/1994 | D'Arcy | 83/811 X |
| 5,600,882 | 2/1997 | Beane | 29/426.4 X |
| 5,802,939 | 9/1998 | Wiand et al. | 83/820 X |

*Primary Examiner*—Rinaldi I. Rada
*Assistant Examiner*—Charles Goodman
*Attorney, Agent, or Firm*—Woodard, Emhardt, Naughton, Moriarty & McNett

[57] ABSTRACT

A saw for removing opposing deck boards from a pallet. A pair of band saws are suspendedly and pivotally mounted to a frame. Guide fingers extend between the saw blades to engage the opposing surfaces of pallet deck boards to automatically position the saw blades with the junctions between deck boards and pallet runners. An upwardly extending bed is cantileverly mounted to the saw supporting the pallet.

16 Claims, 3 Drawing Sheets

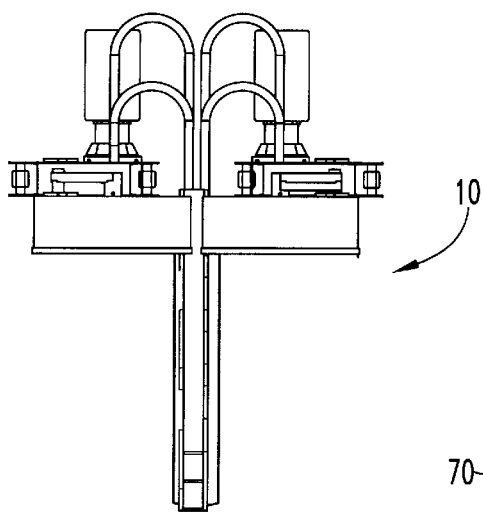
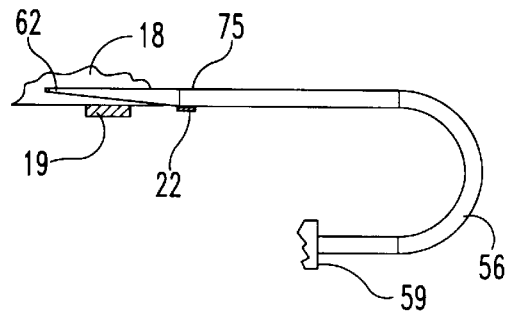
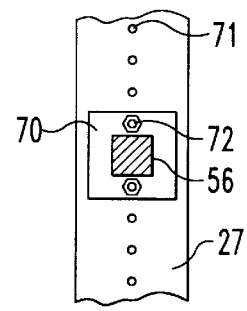
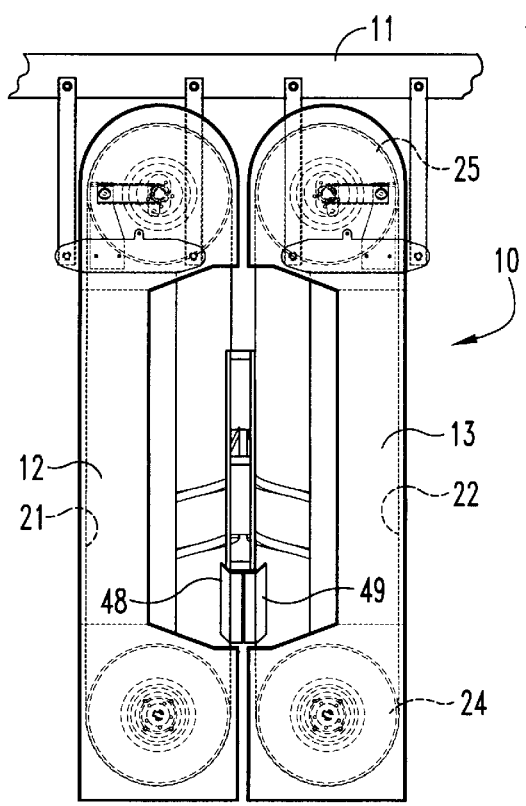
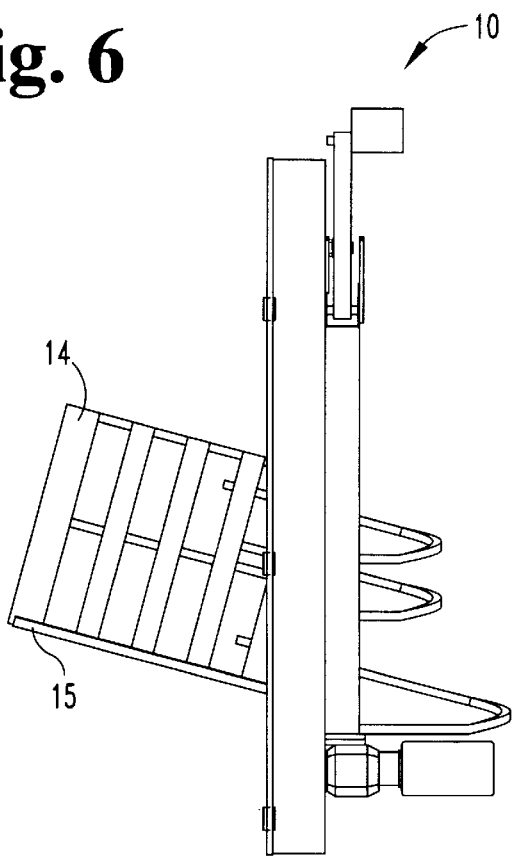

6,128,992

SAW FOR REMOVING TOP AND BOTTOM PALLET DECK BOARDS

BACKGROUND OF THE INVENTION

1. Field of the Invention

The present invention relates generally to the field of saws for removing pallet deck boards from runners.

2. Description of the Prior Art

Wooden pallets are recycled by removing deck boards from the runners extending the length of the pallet. The wooden deck boards are nailed to the wooden runners. After intended use, the size and configuration of a pallet may render it obsolete. Likewise, it is possible for the runners to become damaged. As a result, it is the custom to extend a band saw between the deck boards and runners thereby sawing the nails and allowing the good deck boards and runners to be reused.

In the case of a pallet having top and bottom deck boards mounted to the opposite sides of the runners, it is necessary to remove the deck boards in a two step operation. First, the pallet is moved by a band saw to remove the deck boards on one side of the pallet with the pallet then being withdrawn in the opposite direction, turned over and then moved passed the band saw a second time for the removal of the deck boards on the opposite side. In a high volume pallet repair business, the procedure of passing the pallet past the band saw in two separate steps adds to the cost and time of the operation. We have therefore devised a pallet saw allowing for the simultaneous removal of the deck boards from the opposite sides of a pallet. The saw is designed to automatically accommodate pallets having deck boards and runners of different thickness. As a result, the saw does not have to be manually adjusted to the particular pallet.

SUMMARY OF THE INVENTION

One embodiment of the present invention is a saw for removing first deck boards, each having a first board thickness and second deck boards each having a second board thickness from runners, each having a runner thickness, of a wooden pallet. The saw includes a frame and a bed upon which the wooden pallet is supportable and movable across in a first direction. A first band saw assembly is movably mounted to the frame and extends over the bed and across the first direction. A second band saw assembly is movably mounted to the frame and extends over the bed and across the first direction. A first guide is connected to the first band saw assembly. The first guide extends outwardly over the bed to engage the pallet and align the first band saw between the first deck boards and the runners. A second guide is connected to the second band saw assembly extends outwardly over the bed to engage the pallet and align the second band saw between the second deck boards and the runners. A drive means is connected to the first band saw and the second band saw to move the first band saw and the second band saw across the first direction and between respectively the first deck boards and the runners and the second deck boards and the runners sawing and removing the first deck boards and the second deck boards from the runners.

It is an object of the present invention to provide a saw for simultaneous removal of top and bottom deck boards from a pallet.

A further object of the present invention is to provide a new and improved saw for removing pallet deck boards.

Yet another object of the present invention is to provide a saw for removing deck boards from pallet runners with the saw automatically compensating for varying thickness of the deck boards and runners.

Related objects and advantageous of the present invention will be apparent from the following description.

BRIEF DESCRIPTION OF THE DRAWINGS

FIG. 1 is an edge view of the saw incorporating the present invention.

FIG. 2 is a side view of the saw.

FIG. 3 is a top view of the saw.

FIG. 6 is an enlarged fragmentary view showing the mounting of a guide finger.

FIG. 7 is a top view of a guide finger contacting a pallet.

DESCRIPTION OF THE PREFERRED EMBODIMENTS

Figure 4:
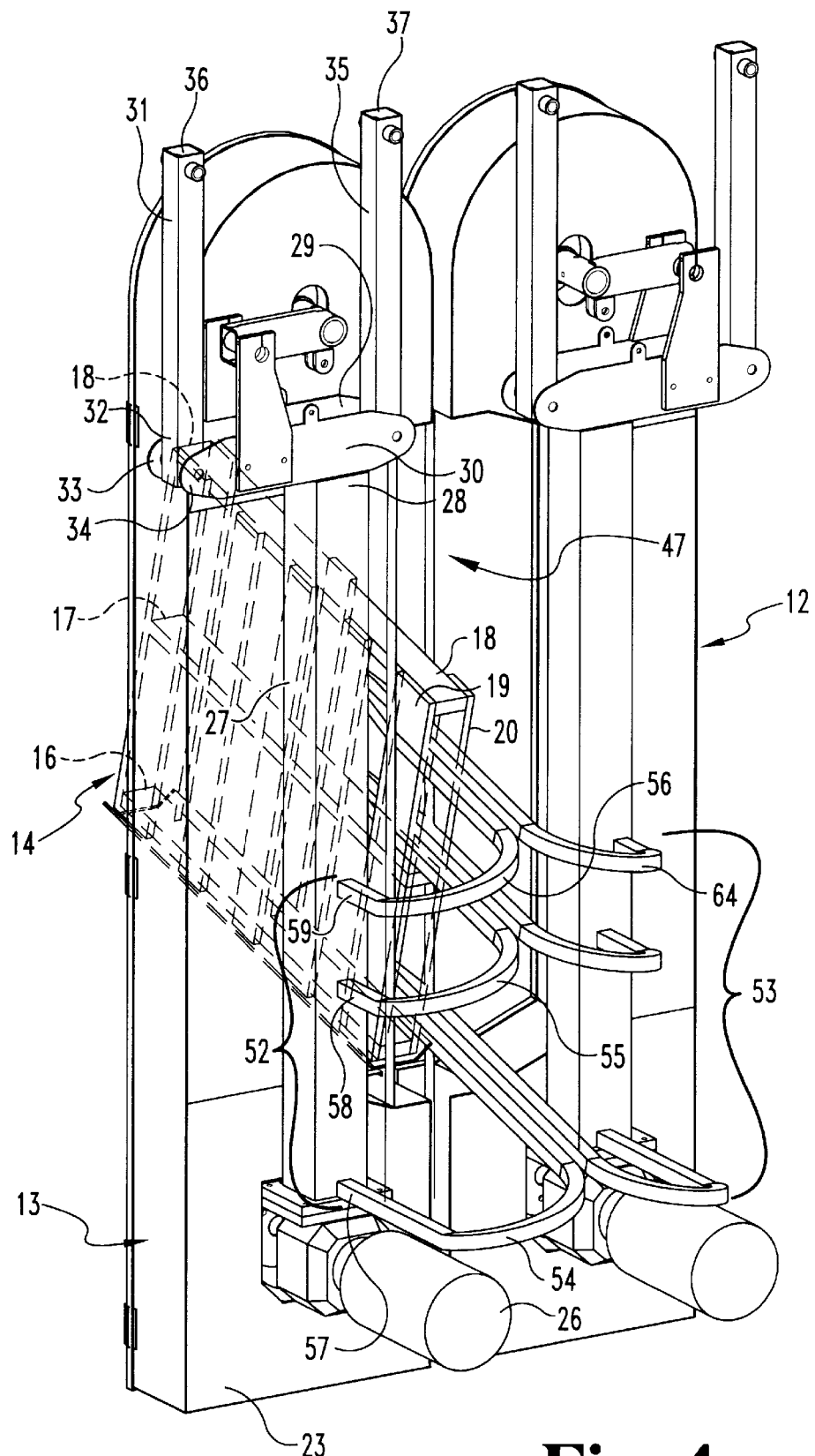
FIG. 4 is an enlarged rear perspective view.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 5:
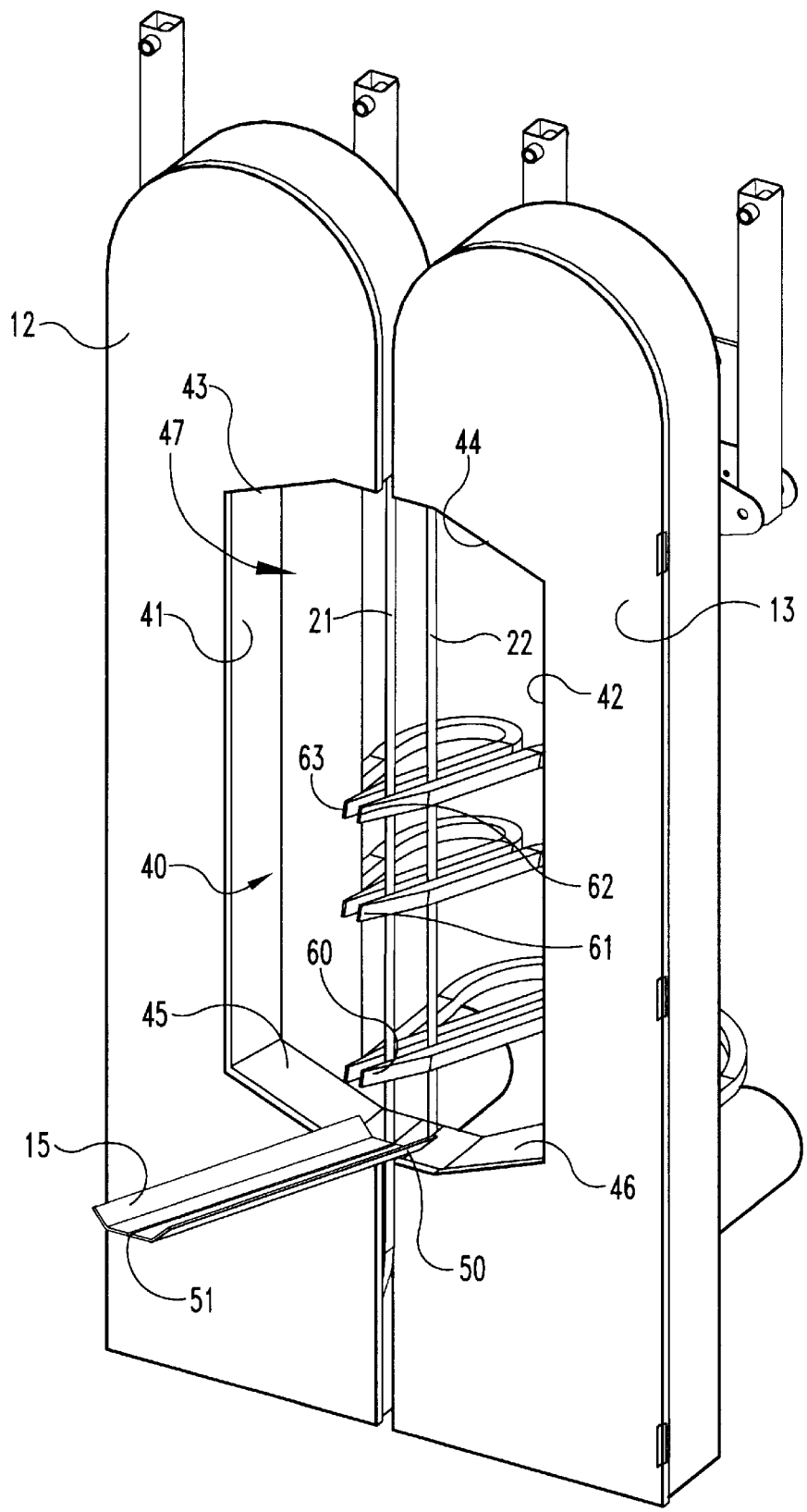
FIG. 5 is an enlarged front perspective view.

Referring now more particularly to the drawings, there is shown a saw 10 having a main frame 11 with a first band saw assembly 12 and a second band saw assembly 13 pivotally mounted and suspended therefrom. Frame 11 is shown in fragment but includes a plurality of legs for supporting the frame on the floor with the frame extending above the two band saw assemblies 12 and 13. The saw is used to remove the deck boards from a conventional wooden pallet 14 restable on its longitudinally extending edge atop a bed 15 for guiding the pallet into the saw and against a pair of band saw blades. Pallet 14 is illustrated in FIGS. 1–4 but is not shown in FIG. 5 in order to demonstrate the construction of the bed and band saw assemblies.

Pallet 14 is conventional in nature and includes a plurality of wooden runners having on the opposite sides thereof a plurality of deck boards. Pallet 14, shown in FIG. 4, includes a bottom runner 16, middle runner 17, and top runner 18. A plurality of first deck boards 19 and a plurality of second deck boards 20 are nailed to the opposite sides of runners 16–18. In normal use, deck boards 19 and 20 extend horizontally for supporting an object atop the pallet. The saw is designed to receive the pallet resting upon its longitudinally extending edge as it is forced downwardly along bed 15 (FIG. 5) to a pair of band saw blades 21 and 22 respectively mounted to band saw assemblies 12 and 13. Band saw blades 21 and 22 must be aligned with the junctions respectively of deck boards 20 and runners 16–18 and deck boards 19 and runners 16–18. Thus, the blades contact the nails in order to saw through the nails and allow the deck boards to fall away from the runners. The top ends of the band saw assemblies 12 and 13 are pivotally mounted to frame 11 with the bottom ends of band saw assemblies 12 and 13 being free to move. A plurality of outwardly extending fingers mounted to band saw assemblies 12 and 13 extend into the pallet contacting the deck boards and pivoting band saw assemblies 12 and 13 inwardly thereby automatically aligning the band saw blades with the junctions between the deck boards and runners.

Band saw assembly 13 will be described it being understood that an identical description applies to band saw assembly 12. Assembly 13 includes an elongated frame 23 (FIG. 4) having a pair of wheels 24 and 25 (FIG. 2) rotatably mounted thereto. Band saw blade 22 is continuous and extends around wheels 24 and 25. The bottom wheel 24 is mounted to the rotatable output shaft of a conventional electric motor 26 (FIG. 4), in turn, fixedly mounted to frame 23. Activation of motor 24 causes wheel 24 to rotate thereby moving saw blade 22.

A strengthening tube 27 extends from motor 26 to the top of frame 13 adding rigidity to the frame. The top end 28 of tube 27 has a pair of cross-members 29 and 30 fixedly mounted to the opposite sides of the tube. The outer ends of cross-members 29 and 30 form flanges pivotally receiving the bottom ends of a pair of elongated members used to pivotally suspend the band saw assembly. Elongated suspension member 31 has a bottom end 32 pivotally mounted to flange ends 33 and 34 of cross members 29 and 30 whereas the bottom end of elongated suspension member 35 is pivotally mounted to the opposite flange ends of cross-members 29 and 30. The top ends 36 and 37 of suspension members 31 and 35 are pivotally mounted to frame 11 thereby suspending assembly 13 and allowing the assembly to swing towards and away from assembly 12.

A pallet trough 40 (FIG. 5) is formed on the side of assemblies 12 and 13 facing the incoming pallet. Trough 40 includes a pair of parallel spaced apart walls 41 and 42 on respectively assemblies 12 and 13, a pair of top walls 43 and 44 and a pair of bottom walls 45 and 46 on the two band saw assemblies. Walls 41–46 form an opening 47 through which the pallet is extendable and through which band saw blades 21 and 22 move. Opening 47 extends over bed 15 to cooperatively with the bed guide the pallet as the deck boards 19 and 20 are sawed from the runners 16–18.

Bed 15 may include a single elongated member cantileverly mounted either to assembly 12 or 13 or may include a pair of mating elongated members cantileverly mounted respectively to assemblies 12 and 13. In the embodiment depicted in FIG. 2, bed 15 includes elongated member 48 and 49 respectively cantileverly mounted to assemblies 12 and 13. Thus, when the assemblies swing together, members 48 and 49 are aligned thereby forming bed 15. Likewise, as the assemblies swing apart to accommodate a larger size pallet then members 48 and 49 will still be aligned but spaced apart to support the opposite longitudinally extending edges of the pallet. The proximal ends 50 (FIG. 5) of members 48 and 49 are fixedly mounted to assemblies 12 and 13 with the outer distal ends 51 being at a higher elevation with respect to ends 50 thereby defining an upwardly extending bed to direct the pallet downwardly at an acute angle relative to band saw blades 21 and 22. As such, the nails securing the first pair of deck boards fastened to runner 18 will be engaged by the saw blades with the nails securing the same deck boards to runner 17 being subsequently engaged by the saw blades and with the nails securing the same deck boards to the bottom runner 16 then being engaged by band saw blades. As a result, pressure on the band saw blade is minimized since they are engaging only the set of nails securing the deck boards to a single runner at any one time.

A first set of guides 52 and a second set of guides 53 (FIG. 4) are mounted respectively to assemblies 13 and 12. Guides 52 will now be described it being understood that a similar description applies to guides 53. In the embodiment shown in FIG. 4, the set of guides 52 is composed of three fingers 54, 55 and 56. The proximal ends 57, 58, and 59 are fixedly mounted to tube 27 on the side of assembly 13 facing away from the incoming pallet. The rods then curve rearwardly toward assembly 12 and then back through opening 47 passing between but spaced only slightly apart or in contact with band saw blades 21 and 22. The three distal ends 60, 61 and 62 (FIG. 5) extend outwardly in front of assemblies 12 and 13 and into the incoming pallet. Further, the guide fingers 54–56 extend upwardly being parallel with bed 15 and with the incoming runners 16–18. The guide fingers are positioned vertically adjacent the runners and contact the inwardly facing surfaces of the deck boards. The guide fingers extend parallel between band saw blades 21 and 22 for a distance of approximately twelve inches in front of the assembly and then converge. For example, finger 56 (FIG. 7) extends from its proximal end 59 rearwardly and inwardly toward finger 64 and has a straight portion 75 extending past saw blade 22 and against the inwardly facing surface of deck board 19 with the finger then converging toward finger 64. Band saw blades 21 and 22 are normally held apart by gravity with the guide fingers contacting the inwardly facing surface of the deck boards and pulling the band saw blades toward each other aligning the blades with the junctions of the deck boards and runners. The straight portion of guide finger 54 corresponding to straight portion 75 of guide finger 56 is positioned adjacent runner 16 and between runners 16 and 17 and at the same time to contact the inwardly facing surfaces of deck boards 19. Likewise, the straight portion of guide finger 55 corresponding to portion 75 of finger 56 is positioned immediately beneath and adjacent runner 17 and against the inwardly facing surfaces of deck boards 19. Guide finger 56 is positioned immediately below and adjacent runner 18 and against the inwardly facing surfaces of deck boards 19.

The lower guide finger of the set of guides 52 are aligned with the lower guide finger of set 53. Likewise, the middle guide finger 55 and top guide finger 56 of set 52 are respectively aligned with the middle and top guide fingers of set 53. Further, the guide fingers of set 52 converge toward the guide fingers of set 53 at their distal ends. For example, guide finger 56 extends toward guide finger 64 as the guide fingers extend toward their respective distal ends 62 and 63. Thus, when distal ends 62 and 63 extend between the inwardly facing surfaces of the first entering deck boards 19 and 20, the deck boards will eventually contact guide fingers 56 and 64. When guide finger 56 contacts the inwardly facing surface of the entering deck board 19, assembly 13 will pivot inward until deck board 19 contacts portion 75 of finger 56 and then, band saw blade 22 will automatically be aligned between the junction of runner 18 and deck board 19. Likewise, when the straight portion of guide finger 64 contacts the inwardly facing surface of the entering deck board 20, the band saw blade 21 will be aligned with the junction between the entering deck board 20 and runner 18. In this manner, assemblies 12 and 13 are free under the force of gravity and the force exerted by the guide fingers on the deck boards, to pivot inward or outward until the band saw blades are aligned with the junctions of the deck boards and runners. As a result, the saw blades will saw only the nails and will not saw the deck boards or runners. As the individual nails are cut into two pieces, the deck boards will be freed of their respective runners. As the pallet is extended further into opening 47, all of the nails will be severed allowing the deck boards to fall downwardly to a suitable collection bin or conveyor for moving the deck boards away from the saw. Normally, assemblies 12 and 13 are suspended and are biased apart but are movable as the guides extend between and against the deck boards. Once the band saw blades are aligned with the junctions between the deck boards and the runners, the two band saws are operable to simultaneously remove the opposing deck boards from the pallet.

Many variations are contemplated and included in the present invention. For example, the cantileverly mounted guide fingers may be mounted to allow changes in the vertical spacing between adjacent fingers in order to accommodate different spacing between adjacent pallet runners. One embodiment includes mounting the proximal ends of the guide fingers to plates, in turn, adjustably mounted to the vertically extending tubes 27. Thus, proximal end 59 of guide finger 56 (FIG. 6) is fixedly mounted to plate 70, in turn, secured to tube 27 by conventional fasteners 72. A plurality of threaded holes 71 are provided along the length of tube 27 to allow removal of fasteners 72 and a change in spacing between the guide fingers. Other means may be used for removably mounting the guide fingers, such as a detent slide mechanism.

Other variations include incorporation of standard motors 26 for driving the band saw blades. For example, electric or hydraulic motors may be utilized. Other variations include incorporation of powered belts on the walls forming trough 40, such as walls 41 and 42, to pull the pallet into opening 47.

While the invention has been illustrated and described in detail in the drawings and foregoing description, the same is to be considered as illustrative and not restrictive in character, it being understood that only the preferred embodiment has been shown and described and that all changes and modifications the come within the spirit of the invention are desired to be protected.

What is claimed is:

1. A saw for removing first deck boards each having a first board thickness and second deck boards each having a second board thickness from runners each having a runner thickness of a wooden pallet comprising:
   a frame;
   a bed upon which the wooden pallet is supportable and movable across in a first direction;
   a first band saw assembly movably mounted to said frame and extending over said bed and across said direction, said first band saw assembly having a first band saw;
   a second band saw assembly movably mounted to said frame and extending over said bed and across said direction, said second band saw assembly having a second band saw;
   a first guide connected to said first band saw assembly, said first guide extending outwardly over said bed to engage said pallet and align said first band saw between said first deck boards and said runners;
   a second guide connected to said second band saw assembly, said second guide extending outwardly over said bed to engage said pallet and align said second band saw between said second deck boards and said runners; and,
   motor means connected to said first band saw and said second band saw to move said first band saw and said second band saw across said direction and between respectively said first deck boards and said runners and said second deck boards and said runners sawing and removing said first deck boards and said second deck boards from said runners while the pallet is moved across said bed in said direction.

2. The saw of claim 1 wherein:
   said first band saw and said second band saw extend vertically and are aligned with each other to simultaneously saw and remove a first deck board and a second deck board from the pallet.

3. The saw of claim 2 wherein:
   said first band saw assembly and said second band saw assembly are pivotally hung from said frame and biased apart by gravity but movable toward each other as said first guide and said second guide extend between and against said first deck boards and said second deck boards.

4. The saw of claim 3 and further comprising:
   a pallet trough mounted to said first band saw assembly and said second band saw assembly defining an opening extending over said bed to guide said pallet as said first deck boards and said second deck boards are sawed.

5. The saw of claim 4 wherein:
   said bed extends outwardly and upwardly from said first band saw and said second band saw to guide said pallet at an acute angle toward said opening.

6. The saw of claim 3 wherein:
   said first band saw assembly and said second band saw assembly each include a pair of suspension members each with a bottom end pivotally mounted thereto and a top end pivotally mounted to said frame, said suspension members are spaced apart to allow gravity to normally force said first band saw and said second band apart.

7. The saw of claim 1 wherein:
   said first guide includes a plurality of first fingers extending between said first band saw and said second band saw and having proximal ends mounted to said first band saw assembly and further having free first distal ends to engage said first deck boards;
   said second guide includes a plurality of second fingers extending between said first band saw and said second band saw having proximal ends mounted to said second band saw assembly and further having free second distal ends to engage said second deck boards; and,
   said first fingers and said second fingers extend toward each other at said free first and second distal ends.

8. The saw of claim 7 wherein:
   said plurality of first fingers and said plurality of second fingers have a pair of bottom fingers aligned with each other and a pair of upper fingers aligned with each other, said upper fingers are movably mounted to said first band saw assembly and said second band saw assembly to allow said upper fingers to be controllably adjusted relative to said lower fingers depending upon spacing between runners of the pallet.

9. A saw for removing first deck boards each having a first board thickness and second deck boards each having a second board thickness from runners each having a runner thickness of a wooden pallet comprising:
   a frame;
   a bed upon which the wooden pallet is supportable and movable across in a first direction;
   a first band saw assembly movably mounted to said frame and extending over said bed and across said direction, said first band saw assembly having a first band saw;
   a second band saw assembly movably mounted to said frame and extending over said bed and across said direction, said second band saw assembly having a second band saw;

a guide connected to said first band saw assembly, said guide extending outwardly over said bed to engage said pallet and align said first band saw between said first deck boards and said runners; and, motor means connected to said first band saw and said second band saw to move said first band saw and said second band saw across said direction and between respectively said first deck boards and said runners and said second deck boards and said runners sawing and removing said first deck boards and said second deck boards from said runners while the pallet is moved across said bed in said direction.

10. The saw of claim 9 and further comprising:

mounting means connected to said frame and said first band saw assembly and said second band saw assembly operable to allow said first band saw assembly to swing relative to said second band saw assembly as said guide engages said pallet.

11. The saw of claim 10 wherein:

said mounting means includes pivot means mounting said first band saw assembly and said second band saw assembly to said frame and allowing said second band saw assembly to swing relative to said first band saw assembly as said guide engages said pallet.

12. A saw for removing first deck boards and second deck boards each having a board thickness from runners each having a runner thickness of a wooden pallet comprising:

a frame;

a first saw assembly movably mounted to said frame, said first saw assembly having a first band saw;

a second saw assembly movably mounted to said frame, said second saw assembly having a second band saw, said second band saw is parallel to said first band saw;

a guide mounted to said frame, said guide extending outwardly to engage said pallet and align said first band saw and said second band saw between respectively said first deck boards and said runners and said second deck boards and said runners; and, motor means connected to said first band saw and said second band saw to move said first band saw and said second band saw between respectively said first deck boards and said runners and said second deck boards and said runners sawing and removing said first deck boards and said second deck boards from said runners while the pallet is moved toward said first band saw and said second band saw.

13. The saw of claim 12 wherein:

said first saw assembly and said second saw assembly are pivotally suspended from said frame and are free to pivotally move in response to force exerted thereon by said guide engaging said pallet.

14. The saw of claim 13 wherein:

said guide includes a plurality of cantileverly mounted fingers extending outwardly from said first saw assembly between said first deck boards and said second deck boards.

15. The saw of claim 14 and further comprising:

a plurality of elongated members having top ends pivotally mounted to said frame and bottom ends pivotally connected to said first saw assembly and said second saw assembly; and, a trough mounted to said first saw assembly and said second saw assembly to cooperatively guide, with said guide, said pallet toward said first band saw and said second band saw.

16. A saw for removing deck boards each having a board thickness from runners each having a runner thickness of a wooden pallet comprising:

a frame;

a first saw assembly movably mounted to said frame, said first saw assembly having a first band saw;

a second saw assembly movably mounted to said frame, said second saw assembly having a second band saw, said second band saw is parallel to said first band saw;

a guide mounted to said frame, said guide extending outwardly to engage said pallet and align said first band saw and said second band saw between said deck boards and said runners; and, a motor apparatus connected to said first band saw and said second band saw to move said first band saw and said second band saw between said deck boards and said runners sawing and removing said deck boards from said runners while the pallet and said first band saw and said second band saw move together.

* * * * *